F. T. ADAMS.
VARIABLE SPEED TRANSMISSION DEVICE.
APPLICATION FILED AUG. 14, 1911.

1,028,522.

Patented June 4, 1912.

WITNESSES:
E. Peterson
H. Barnes

INVENTOR
Frederick T. Adams
BY
Pierre Barnes
ATTORNEY

UNITED STATES PATENT OFFICE.

FREDERICK T. ADAMS, OF VICTORIA, BRITISH COLUMBIA, CANADA.

VARIABLE-SPEED-TRANSMISSION DEVICE.

1,028,522. Specification of Letters Patent. Patented June 4, 1912.

Application filed August 14, 1911. Serial No. 643,896.

*To all whom it may concern:*

Be it known that I, FREDERICK T. ADAMS, a subject of the King of England, residing at Victoria, in the Province of British Columbia, and Dominion of Canada, have invented certain new and useful Improvements in Variable-Speed-Transmission Devices, of which the following is a specification.
The object of this invention is the perfecting of that class of variable speed transmission devices wherein a fluid is employed as the controlling agent.

The invention is illustrated in the accompanying drawings, in which—

Figure 1:
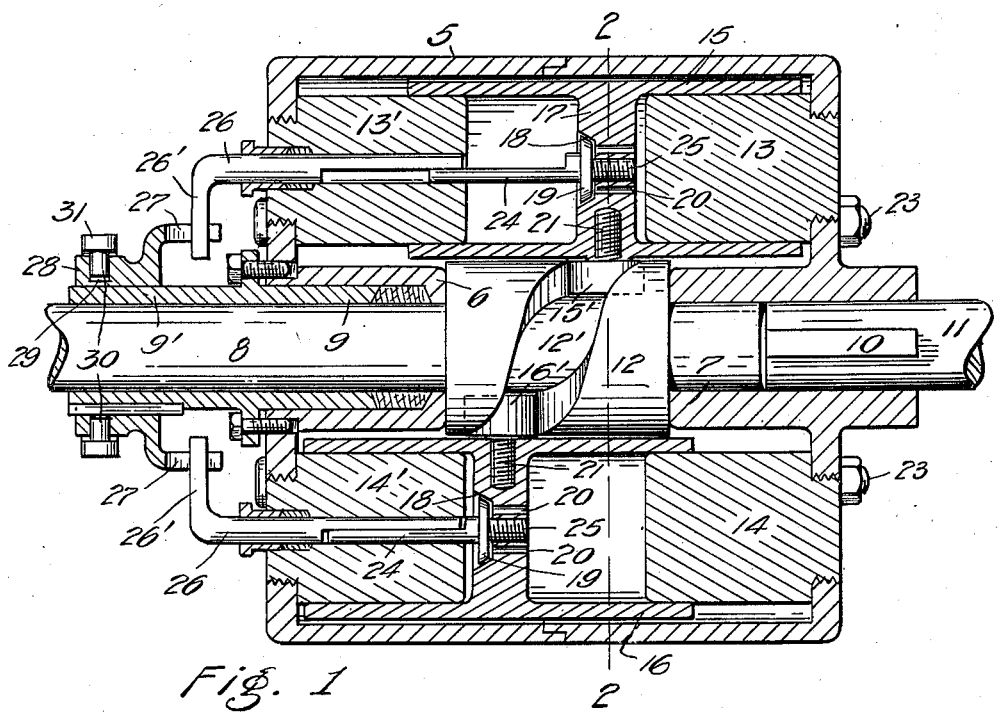
Figure 3:
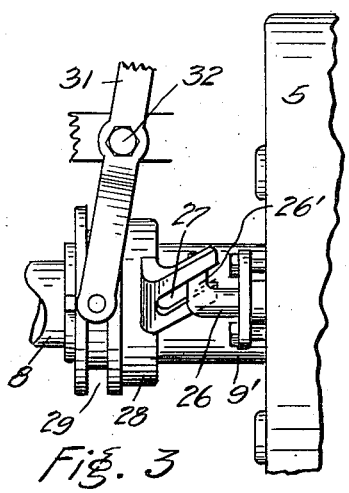
Figure 2:
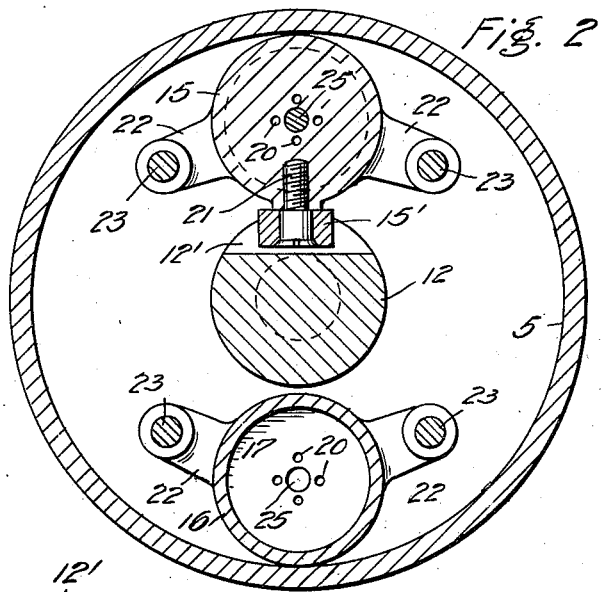
Figure 4:
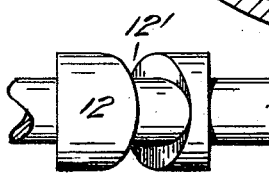

Figure 1 is a longitudinal vertical section. Fig. 2 is a transverse section taken through 2—2 of Fig. 1. Fig. 3 is a fragmentary plan view. Fig. 4 is a detail view of the driving shaft shown at right angles to that in which it is represented in Fig. 1.

The reference numeral 5 designates a casing which constitutes the driven member of the device and is provided at its opposite ends with hubs 6 and 7. Extending through the hub 6 and into the hub 7 is a driving member, or shaft, 8. The hub 6 is desirably chambered and provided with a gland 9 to afford a stuffing box for the shaft. As illustrated, a second shaft 11, hereinafter designated as the driven shaft, is seated in and rigidly secured, as by a key 10, to said casing in the hub 7. Provided on shaft 8 intermediate said casing hubs is a collar 12 provided with a peripheral cam groove 12' substantially of the form in which it is illustrated in Figs. 1 and 4.

Secured to the ends 5' of the casing are axially alined pairs 13, 13' and 14, 14' of cylindrical elements which serve as plungers for tubular elements, or cylinders 15 and 16. Each of these cylinders is provided intermediate its length with a partition 17 having at one side thereof a seat 18 for a valve 19 which serves to regulate the passage to holes 20 extending through a partition. Extending radially from each of said cylinders is a stud 21 upon which are respectively mounted rollers 15' and 16' extending into the aforesaid cam groove 12' of the collar of the driving member. As shown in Fig. 2, the cylinders are formed with wings 22 which are bored to receive longitudinally disposed guide rods 23.
The valves 19 are provided with axially disposed stems 24 at one side of each and screw threaded studs 25 at the other side for engagement in correspondingly threaded holes provided in the partitions 17 of the respective cylinders.
26 represent spindles which extend from a distance outside of the casing axially through the plungers 13' and 14' and are adapted to rotatably engage the valve-stems 24. An advantageous manner of thus uniting a valve stem with its complementary spindle is by forming the same with overlapping semi-cylindrical coupling ends as shown in Fig. 1. The outer extremities of said spindles are provided with fingers 26' which extend into spirally arranged slots 27 of a shifter element 28 which is splined on an extension 9' of said gland to rotate in unison with the casing. This shifter element is formed with a peripheral groove 29 to receive the studs 30 carried by the forked ends of a lever 31 fulcrumed at 32 and by manipulating the lever said shifter element is caused to be moved toward or away from the casing to effect, through the instrumentality of the above-mentioned slots, turning movements to the spindles 26. When the latter are turned the valves are similarly affected with the result that the threaded studs 25 thereof are screwed into or partially retracted from the holes therefor of the partitions 17 with the result that the valves are actuated to regulate the amount of fluid which may pass through the passages 20.
The operation of the invention is as follows: When the valves 19 are full open with respect to their seats 18, the controlling fluid, which is preferably a liquid, is free to flow uninterruptedly through the passages 20 when the cylinders 15 and 16 are reciprocated through the offices of the rolls 15' and 16' tracking in the rotating cam slot 12' of the driving member. Under these conditions, that is to say, with the cylinders freely movable endwise of the casing or driven member there is no rotary motion transmitted thereto. When the valves 19 are adjusted, as above explained, by manipulating the lever 31 to close or nearly close the valves with respect to their seats, the flow of the fluid through the passages 20 from one side of the cylinder-partitions to the other is stopped or partially retarded, as the case may be, to prevent longitudinal movement, or retard such movement, to the cylinders with the result that the driven member is rotated with the driving member at the same or at a lesser speed. In other words, when the passages 20 are full open, so to speak, the cylinders are influenced by the cam slot acting through rolls 15' and 16' to impart only longitudinal movements to the cylinders; when the passages are closed, there will be practically no longitudinal movement, where liquid is used as the controlling agent, and the cylinders will be revolved to rotate the driven member in unison with the driving member; but when the passages are partly open, the cylinders will partake of both longitudinal and revoluble motions to transmit rotation to the driven member proportionately to the amounts of the referred to motions occurring to the cylinders.

It is to be understood that the number of cylinders and plungers carried by the driven member may be varied and that the disposition of the cylinders and plungers may be reversed, that is to say, the cylinders may be rigidly secured to the driven member and the plungers given longitudinal reciprocatory motions from the cam on the driving member.

What I claim, is—

1. In a variable speed power transmission device, the combination with a driving shaft and a cam thereon, of a plurality of longitudinally movable cylinders, operative connection between the cylinders and said cam, plungers for the respective cylinders, a body of fluid, means for controlling the flow of the fluid in said cylinders, and a casing surrounding the aforesaid parts and to which said plungers are connected for support.

2. In a variable speed power transmission device, a driving shaft, a cam thereon, a cylinder having a partition intermediate its length, a passage extending through said partition, a valve for regulating the amount of opening of said passage, a driven shaft, plungers extending into the opposite ends of said cylinder and connected to said driven shaft to revolve therewith, operative connection between the cylinder and said cam whereby longitudinal movements of the cylinder is effected, a body of fluid, and means for controlling said valve to regulate the flow of the fluid through said passage.

3. In a variable speed power transmission device, a driving member, a driven member, interfitting plunger and cylinder elements carried by the driven member and arranged for relative axial movements, a cam provided on the driving member, devices provided on one of said elements and coöperating with said cam for effecting the axial movement thereof, a body of fluid, and a valve for controlling the flow of the fluid whereby the driven member is rotatably connected with the driving member.

4. In a variable speed transmission device, a driving shaft, a driven shaft, cylinders and plungers revolubly connected with the driven shaft and having axial movements with respect to each other, means provided upon the driving shaft for effecting such axial movements, and means for controlling the flow of a fluid to and from the respective cylinders whereby said axial movements of the cylinders may be regulated to operatively connect the driven and driving shafts.

5. In a variable speed transmission device, a driving member, a driven member, a cylinder, an apertured partition separating the cylinder into two chambers, a valve for the aperture of said partition, a plunger for each of the cylinder chambers, and carried by said driven member, a means provided on the driving member and acting to effect reciprocating axial movements to the cylinder, a body of fluid for retarding the axial movements of the cylinder, and a valve for controlling the circulation of the fluid whereby the driven member is caused to rotate with the driving member.

6. In a variable speed power transmission device, a driving shaft, a cam provided thereon, a casing surrounding the shaft and connected therewith against independent axial movements, a pair of axially arranged plungers secured to the ends of said casing, a cylinder divided by a partition into two chambers to receive the respective plungers, a passageway connecting said chambers, a stud connected to the cylinder and coöperating with said cam to afford longitudinal reciprocating movements to the cylinder, a body of fluid, a valve for said passageway whereby the flow of the fluid from one of said chambers to the other is regulated for retarding the axial movements of the cylinders.

Signed at Victoria, B. C., Canada, this 4th day of August, 1911.

FREDERICK T. ADAMS.

Witnesses:
E. PETERSON,
H. BARNES.